United States Patent
Dreps et al.

(10) Patent No.: US 9,529,406 B2
(45) Date of Patent: *Dec. 27, 2016

(54) SYSTEM INTERCONNECT DYNAMIC SCALING BY LANE WIDTH AND OPERATING FREQUENCY BALANCING

(71) Applicant: INTERNATIONAL BUSINESS MACHINES CORPORATION, Armonk, NY (US)

(72) Inventors: Daniel Mark Dreps, Austin, TX (US); Frank D. Ferraiolo, Naples, FL (US); Anand Haridass, Bangalore (IN); Prasanna Jayaraman, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 183 days.

This patent is subject to a terminal disclaimer.

(21) Appl. No.: 14/302,628

(22) Filed: Jun. 12, 2014

(65) Prior Publication Data

US 2015/0301576 A1    Oct. 22, 2015

Related U.S. Application Data

(63) Continuation of application No. 14/253,916, filed on Apr. 16, 2014.

(51) Int. Cl.
*G06F 1/32* (2006.01)

(52) U.S. Cl.
CPC ............ *G06F 1/324* (2013.01); *G06F 1/3243* (2013.01); *Y02B 60/1217* (2013.01); *Y02B 60/1239* (2013.01)

(58) Field of Classification Search
CPC ............ G06F 1/32; G06F 1/324; G06F 13/00; G06F 13/36
See application file for complete search history.

(56) References Cited

U.S. PATENT DOCUMENTS 6,134,676 A    10/2000    VanHuben et al.
6,496,925 B1    12/2002    Rodgers et al.
(Continued)

FOREIGN PATENT DOCUMENTS

JP    2009259217 A    11/2009
JP    2011181006 A    9/2011

OTHER PUBLICATIONS

List of IBM Patents or Patent Applications Treated as Related, 1 page.

(Continued)

*Primary Examiner* — Fahmida Rahman
(74) *Attorney, Agent, or Firm* — Mitch Harris, Atty at Law, LLC; Andrew M. Harris; Steven L. Bennett

(57) ABSTRACT

Interface management techniques provide reduced power consumption along with reducing heat and EMI generation in a computer system having multiple interconnected processing units. Physical link layers of external interfaces that interconnect the processing units have dynamically adjustable bandwidth provided by an adjustable width and adjustable operating frequency. The bandwidths may be dynamically adjusted by predicting interface bandwidth requirements. From a required bandwidth, an active width and an operating frequency for the physical link layers are determined and set. The interface is operated according to the determined width and operating frequency.

6 Claims, 5 Drawing Sheets

(56) References Cited

U.S. PATENT DOCUMENTS

| | | | |
|---|---|---|---|
| 6,842,463 B1 | 1/2005 | Drwiega et al. | |
| 7,080,288 B2 | 7/2006 | Ferraiolo et al. | |
| 7,116,682 B1 | 10/2006 | Waclawsky et al. | |
| 7,117,126 B2 | 10/2006 | Floyd et al. | |
| 7,136,953 B1 | 11/2006 | Bisson et al. | |
| 7,536,490 B2 | 5/2009 | Mao | |
| 7,613,126 B1 | 11/2009 | Natarajan et al. | |
| 7,694,027 B2 | 4/2010 | Montag | |
| 7,721,039 B2 | 5/2010 | Irisa | |
| 7,760,643 B2 | 7/2010 | Kim et al. | |
| 7,809,869 B2 * | 10/2010 | Atherton | G06F 13/387 710/104 |
| 8,050,174 B2 | 11/2011 | Becker et al. | |
| 8,868,955 B2 | 10/2014 | Iyer et al. | |
| 9,152,596 B2 | 10/2015 | Wagh et al. | |
| 2003/0088799 A1 | 5/2003 | Bodas | |
| 2003/0202482 A1 | 10/2003 | Dittman et al. | |
| 2005/0119860 A1 | 6/2005 | Hsu et al. | |
| 2008/0022024 A1 * | 1/2008 | Mao | H04L 41/0896 710/104 |
| 2008/0263254 A1 | 10/2008 | Su et al. | |
| 2010/0082851 A1 | 4/2010 | Green et al. | |
| 2011/0055370 A1 | 3/2011 | Kern et al. | |
| 2011/0222111 A1 | 9/2011 | Shima | |
| 2013/0159761 A1 | 6/2013 | Baumgartner et al. | |
| 2013/0346722 A1 * | 12/2013 | LaBerge | G11C 5/02 711/167 |
| 2013/0346772 A1 * | 12/2013 | Abou Gazala | G06F 1/32 713/320 |
| 2014/0301733 A1 * | 10/2014 | Hu | H04B 10/0795 398/25 |

OTHER PUBLICATIONS

U.S. Appl. No. 14/147,746, filed Jan. 6, 2014, Dreps, et al.
U.S. Appl. No. 14/253,916, filed Apr. 16, 2014, Dreps, et al.
U.S. Appl. No. 14/299,415, filed Jun. 9, 2014, Dreps, et al.
List of IBM Patents or Patent Applications Treated as Related, 2 pages.
U.S. Appl. No. 14/462,278, filed Aug. 18, 2014, Dreps, et al.
U.S. Appl. No. 14/464,924, filed Aug. 21, 2014, Dreps, et al.
International Search Report and Written Opinion in PCT/IB2015/052533 mailed on Aug. 4, 2015, 7 pages (pp. 1-7 in pdf).
Office Action in U.S. Appl. No. 14/253,916 mailed on Jan. 29, 2016, 15 pages (pp. 1-15 in pdf).

* cited by examiner

SYSTEM INTERCONNECT DYNAMIC SCALING BY LANE WIDTH AND OPERATING FREQUENCY BALANCING

The present application is a Continuation of U.S. patent application Ser. No. 14/253,916, filed on Apr. 16, 2014 and claims priority thereto under 35 U.S.C. §120. The disclosure of the above-referenced parent U.S. patent application is incorporated herein by reference.

BACKGROUND OF THE INVENTION

1. Field of the Invention

The present invention relates generally to interconnected processing systems, and more particularly, to processing systems that dynamically control I/O interface performance and power consumption.

2. Description of Related Art

Interfaces within and between present-day integrated circuits have increased in operating frequency and width. In particular, in multiprocessing systems, both wide and fast connections are provided between many processing units. Data width directly affects the speed of data transmission between systems components, as does the data rate, which is limited by the maximum frequency that can be supported by an interface. However, such fast and wide interconnects are significant power consumers in a computer system formed from interconnected processing units.

The processing units in a multi-processing system, particularly a symmetric multi-processing system (SMP) may need to communicate at any time, since, for example, when close affinity is provided between processors, a processor might access memory that is located on a remote node, but that is otherwise available in the processor's memory space. Therefore, for the above and other reasons, present-day multi-processing systems typically keep the physical layer of the interfaces operational and cycle idle data patterns on the interconnects in order to maintain calibration of the links when transmissions are not being made over the interface physical layer. However, such operation wastes power, generates heat, and raises background noise levels (electromagnetic emissions) in the system. The alternative of placing the interface physical layers in a power-managed state would lead to unacceptable latency for transactions.

It is therefore desirable to provide a method that more effectively manages the state of interface physical link layers in a multi-processing system to reduce power consumption and background noise levels.

BRIEF SUMMARY OF THE INVENTION

The above-mentioned objective of providing improved performance and/or power efficiency of a system interconnect physical layer between processing units is provided in a method.

The method is a method of managing the state of a physical link layer of external interfaces that interconnect processing units of a computer system. The physical link layers have dynamically adjustable bandwidth provided by an adjustable width and adjustable operating frequency. The bandwidths may be dynamically adjusted by predicting interface bandwidth requirements. From a required bandwidth, an active width and an operating frequency for the physical link layer are determined and set. The interface is operated according to the determined width and operating frequency.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention encompasses techniques for controlling the bandwidth, including the width and/or frequency of links, such as parallel busses or serial connections, that interconnect processing units in a processing system. A required bandwidth is determined from demand and/or a predicted bandwidth requirement, and an active width and operating frequency are determined from the required bandwidth and other considerations, such as predicted future bandwidth requirements.

Figure 1:
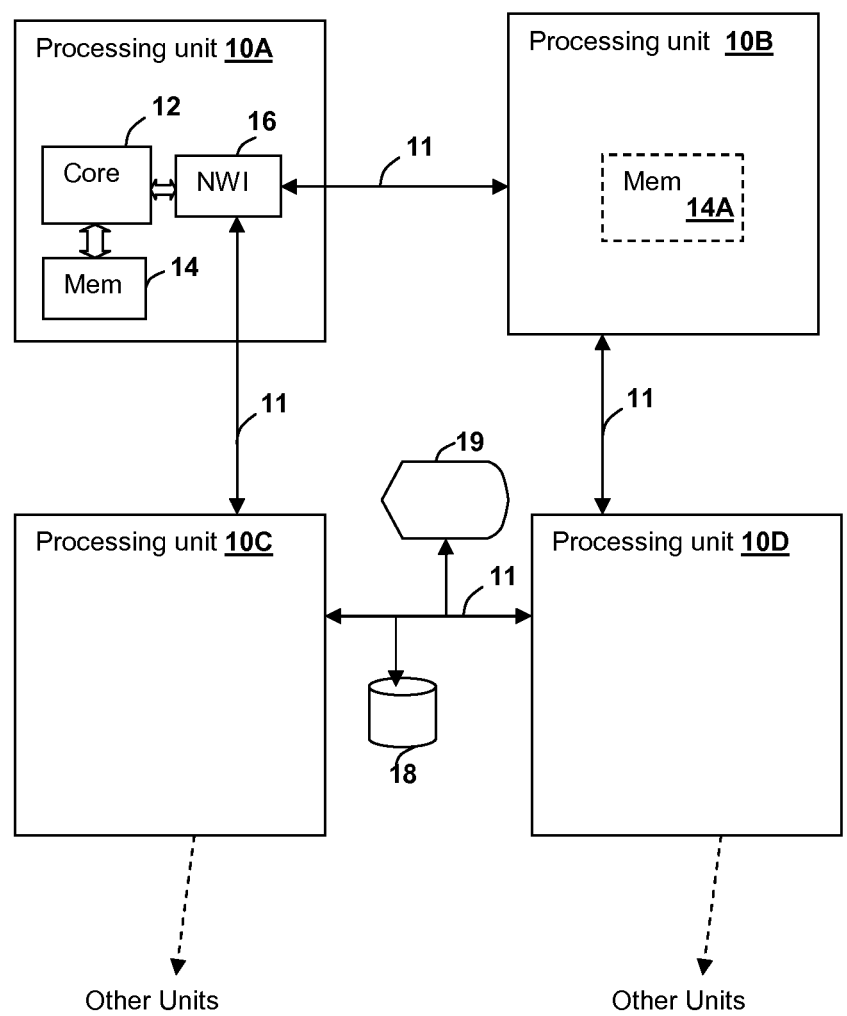
FIG. 1 is a block diagram of a computer system in which techniques in accordance with embodiments of the invention are implemented.

With reference now to the figures, and in particular with reference to FIG. 1, a distributed computer system in accordance with an embodiment of the present invention is shown. A first processing unit 10A includes a processor core 12 coupled to a memory 14 that stores program instructions for execution by processor core 12. The program instructions may include program instructions forming computer program products that perform portions of the techniques disclosed herein within processing units 10A-10D. Processing unit 10A also includes a network interface (NWI) 16 that couples processing unit 10A to interface links 11, which are wired or wireless links to other processing units 10B, 10C, and provide for access between processing unit 10A and resources such as remote memory 14A within processing unit 10B. Links 11 have dynamically adjustable bandwidth/power consumption, which is controlled as disclosed below. Other processing units 10B-10D are of identical construction in the exemplary embodiment, but embodiments of the invention may be practiced in asymmetric distributed systems having processing units with differing features. The distributed computer system of FIG. 1 also includes other resources such as I/O devices 19, including graphical display devices, printers, scanners, keyboards, mice, which may be coupled to the links 11 or one of processing units 10A-10D. Processing units 10A-10D are also coupled to storage devices 18 for storing and retrieving data and program instructions, such as storing computer program products in accordance with an embodiment of the invention.

Figure 2:
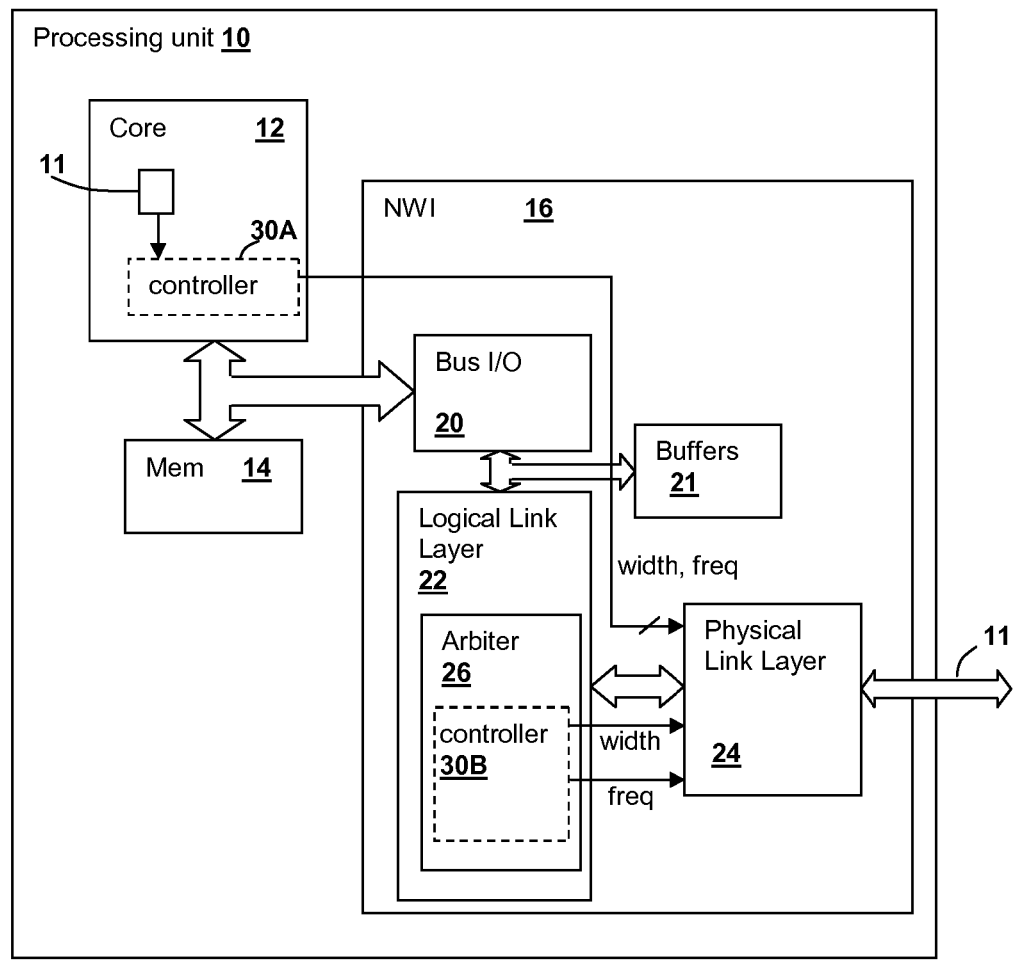
FIG. 2 is a block diagram showing details of a processing unit 10 that can be used to implement processing units 10A-10D of FIG. 1.

Referring now to FIG. 2, details within a processing unit 10 that can be used to implement processing units 10A-10D are shown. Within processing unit 10, controllers 30A, 30B are shown to illustrate two possible locations of a controller that manages the bandwidth of a physical link layer 24 of interface 11 according to a control value width and a control value freq that control the bandwidth of interface 11 by setting the active width, i.e., the number of active lanes and the operating frequency of interface 11. Controller 30A is located within core 12, while controller 30B is located within a network interface (NWI) 16 coupled to core 12 and memory 14 by a bus I/O unit 20. Network interface 16 also includes buffers 21 for storing data transferred to and from bus I/O unit 20 by a logical link layer 22 of interface 11. By reducing the bandwidth of interface 11, either by reducing the number of active lanes, reducing the operating frequency or both, the power consumption of interface 11 can be reduced, as well as noise emissions and other effects produced by maintaining interface 11 in a full bandwidth operating mode. Control logic within one or more of controllers 30A, 30B detects events that are indicative of future external bus transactions that are likely to be issued over interface 11. Prediction of future external bus transactions may be performed as described in U.S. patent application Ser. No. 14/147,746, now U.S. Pat. No. 9,324,030, entitled "SYSTEM INTERCONNECT DYNAMIC SCALING BY PREDICTING I/O REQUIREMENTS" filed on Jan. 6, 2014, the disclosure of which is incorporated herein by reference. For example, controller 30A within core 12 may detect hardware events that correspond to operations that will generate I/O transactions over interface 11. System level events can be used to predict and trigger an increase in link bandwidth between the core on which the thread is running and the location of the remote memory, so that when the inevitable memory accesses by the thread occur, the link is operating at sufficient bandwidth. Examples of such events are such as a hypervisor executing within processing unit 10 starting a thread with an association to remote memory, or the association of remote memory to a running thread. Similarly, controller 30B within an arbiter 26 of logical link layer 22 may detect an event within logical link layer 22 indicating that the physical link layer 24 will soon need to be active for a number of transactions.

Figure 3:
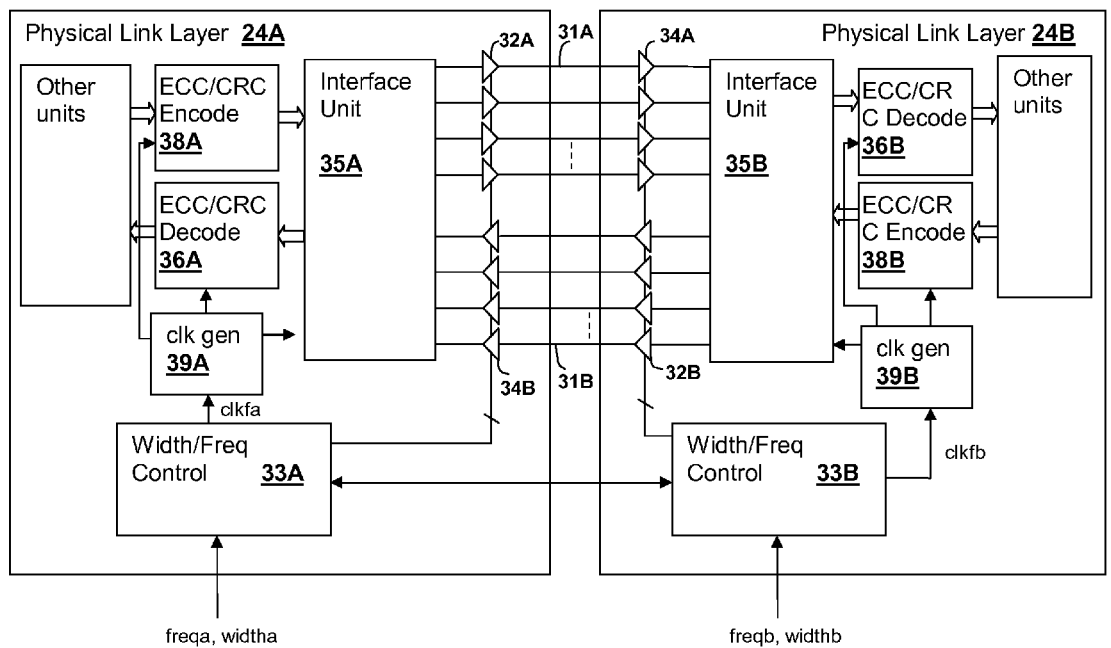
FIG. 3 is a block diagram of an interface connecting two processing blocks in the computer system of FIG. 1.

Referring now to FIG. 3, a bus interface is depicted connecting two physical link layers 24A and 24B, as might be implemented between processors 10A and 10B of FIG. 1. While physical link layers 24A and 24B are used to illustrate and support the data connection of two units, the techniques of the present invention extend to address, control and other signal types, as well as connection of memories, peripherals and other functional units within a computer system or other electronic device. The interface between physical link layers 24A and 24B is made by a physical connection of output signals 31A from physical link layer 24A to inputs of physical link layer 24B and output signals 31B from physical link layer 24B to inputs of physical link layer 24A, in which the active width and operating frequency are dynamically controllable to provide power savings when the full operating bandwidth available from interface 11 is not needed.

Within physical link layers 24A and 24B, input signals are received by interface units 35A and 35B, features of which may include features as described in detail in U.S. Pat. No. 8,050,174 entitled "SELF HEALING CHIP-TO-CHIP INTERFACE", U.S. Pat. No. 7,117,126 entitled "DATA PROCESSING SYSTEM AND METHOD WITH DYNAMIC IDLE FOR TUNABLE INTERFACE CALIBRATION" and in U.S. Pat. No. 7,080,288 entitled "METHOD AND APPARATUS FOR INTERFACE FAILURE SURVIVABILITY USING ERROR CORRECTION." The disclosures of the above-referenced U.S. Patents are incorporated herein by reference. Signals on output signals 31A and 31B are received by interface units 35A and 35B. At the opposing ends of the bus interface, receivers 34A and 34B receive output signals 31A and 31B provided from driver circuits 32A and 32B, respectively. The outputs of interface units 35A and 35B are provided to error checking and correction (ECC) and/or cyclic-redundancy check decode units 36A and 36B that are capable of detecting and correcting errors. The present invention uses ECC/CRC decode units 36A and 36B to not only correct dynamic bit errors as ECC units are typically employed to correct, but to maintain interface operation when a bit-lane has completely failed or when variations occur between the frequency of operation of the two ends of the interface. Output drivers 32A and 32B are preferably provided on-chip (but could be located off-chip) and receive ECC/CRC encoded data from ECC/CRC encode units 38A and 38B that provide the proper correctable bit patterns for transmission between physical link layers 24A and 24B over interface connections 31A and 31B. Interface units 35A, 35B contain control logic and buffers that permit operation of the bus interface over a wide frequency variation, e.g., a range of 1.25:1. However, additionally, the clock that determines the operating frequency of interface 11 may be altered by a much wider range (e.g., 1x, 2x, 4x) as will be described in further detail below.

To control the power consumption of physical link layers 24A and 24B, some of output signals 31A and 31B, corresponding to "lanes" of the interface, may be disabled. For example, a 64-bit interface 11 may support a 32-bit, 16-bit and 8-bit mode in addition to a full-width 64-bit mode. When lanes are disabled, both the corresponding driver circuits 32A and 32B and corresponding receivers 34A and 34B can be powered-down, reducing power consumption directly. Additionally other logic, such as logic and buffers within interface units 35A-35B, ECC/CRC, encode units 38A-38B and ECC/CRC decode units 36A-36B can be simplified/powered-down when lanes are deactivated to provide even further power savings. If CRC checking is employed across the lanes of the interface, stripe length is generally adjusted when selecting a different active width for interface 11, so that a consistent block size is maintained. As mentioned above, alternatively or in combination, the operating frequency of interface 11 may be adjusted by changing the clock frequency generated by clock generators 39A and 39B, as long as both ends of interface 11 are informed to operate at the same frequency by selecting the same control value for clock selection signals clkfA and clkfB provided to clock generators 39A and 39B, respectively. Alternatively, separate transmit and receive clock outputs from clock generators 39A and 39B can be provided for transmit and receive circuits within physical link layers 24A and 24B, so that output signals 31A can be operated at one interface operating frequency and that output signals 31B can be separately operated at a second interface operating frequency. Information is shared between interface width/frequency control units 33A-33B to ensure that the receiver side of EI units 35A, 35B and ECC Decode units 36A-36B are provided with the proper clock to match the clock provided to the transmit side of EI units 35A, 35B in the other one of physical link layers 24A and 24B.

Figure 4:
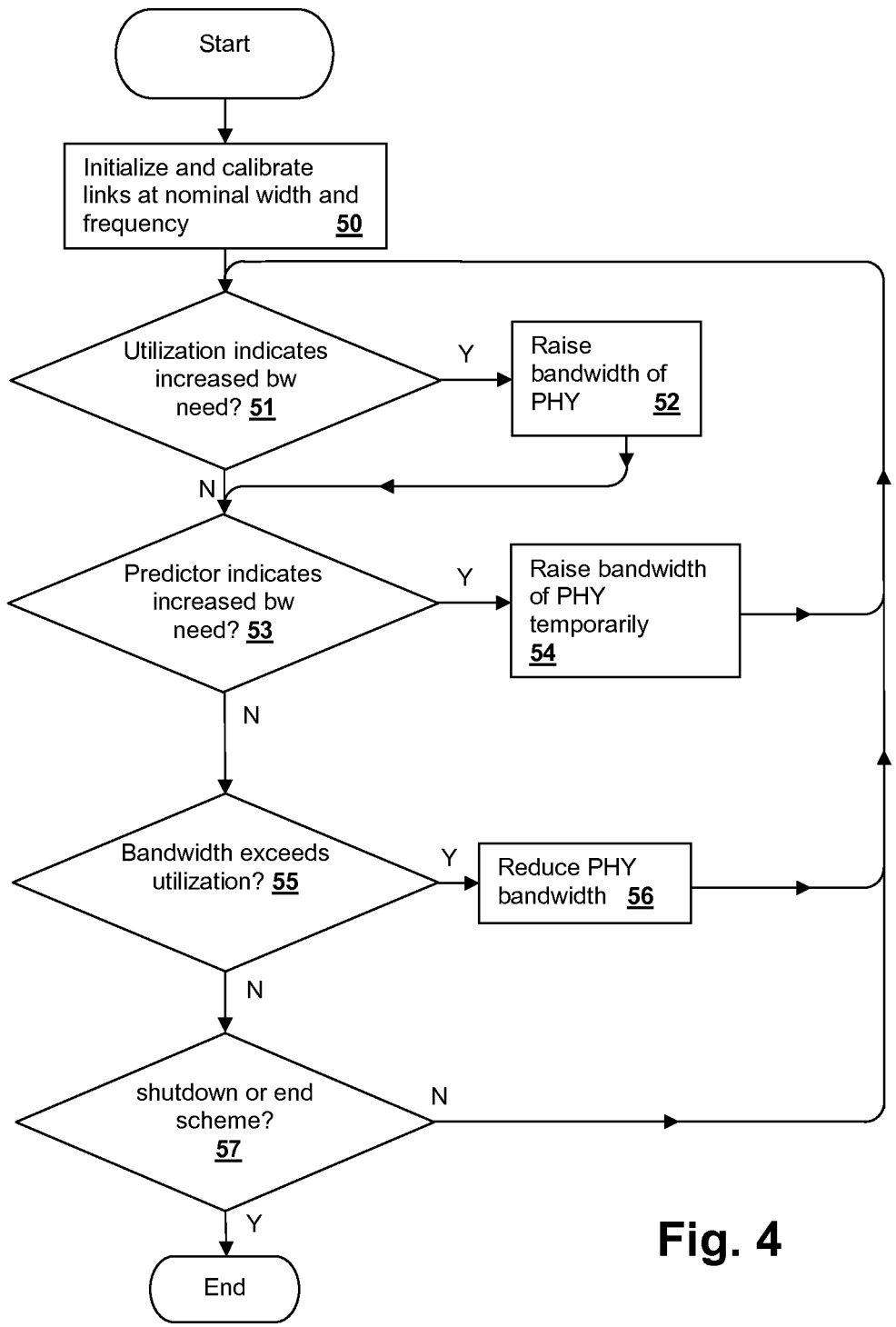
FIG. 4 is a flowchart showing an exemplary method of operating a processing system.

Referring now to FIG. 4, a method of operating an interface physical link layer is illustrated in a flowchart. First, interface links between processing units are initialized and calibrated at a nominal interface width and frequency (step 50). If the utilization of the interface, i.e., the directly measured I/O demand indicates a need for increased bandwidth (decision 51), the bandwidth of the physical layer (PHY) is raised (step 52). If a bandwidth predictor is employed and indicates an upcoming need for increase bandwidth (decision 53), the bandwidth of the physical layer (PHY) is raised temporarily, e.g., for a predetermined time period (step 54) and steps 51-54 are repeated. However, if the utilization of the interface, i.e., the directly measured I/O demand did not indicate a need for increased bandwidth (decision 51) and the bandwidth predictor does not indicate an upcoming need for increase bandwidth (decision 53), then if the bandwidth of the interface exceeds utilization needs (decision 55), the bandwidth of the physical layer (PHY) is lowered (step 56). Until the scheme is ended or the system is shut down (decision 57), steps 51-56 are repeated.

Figure 5:
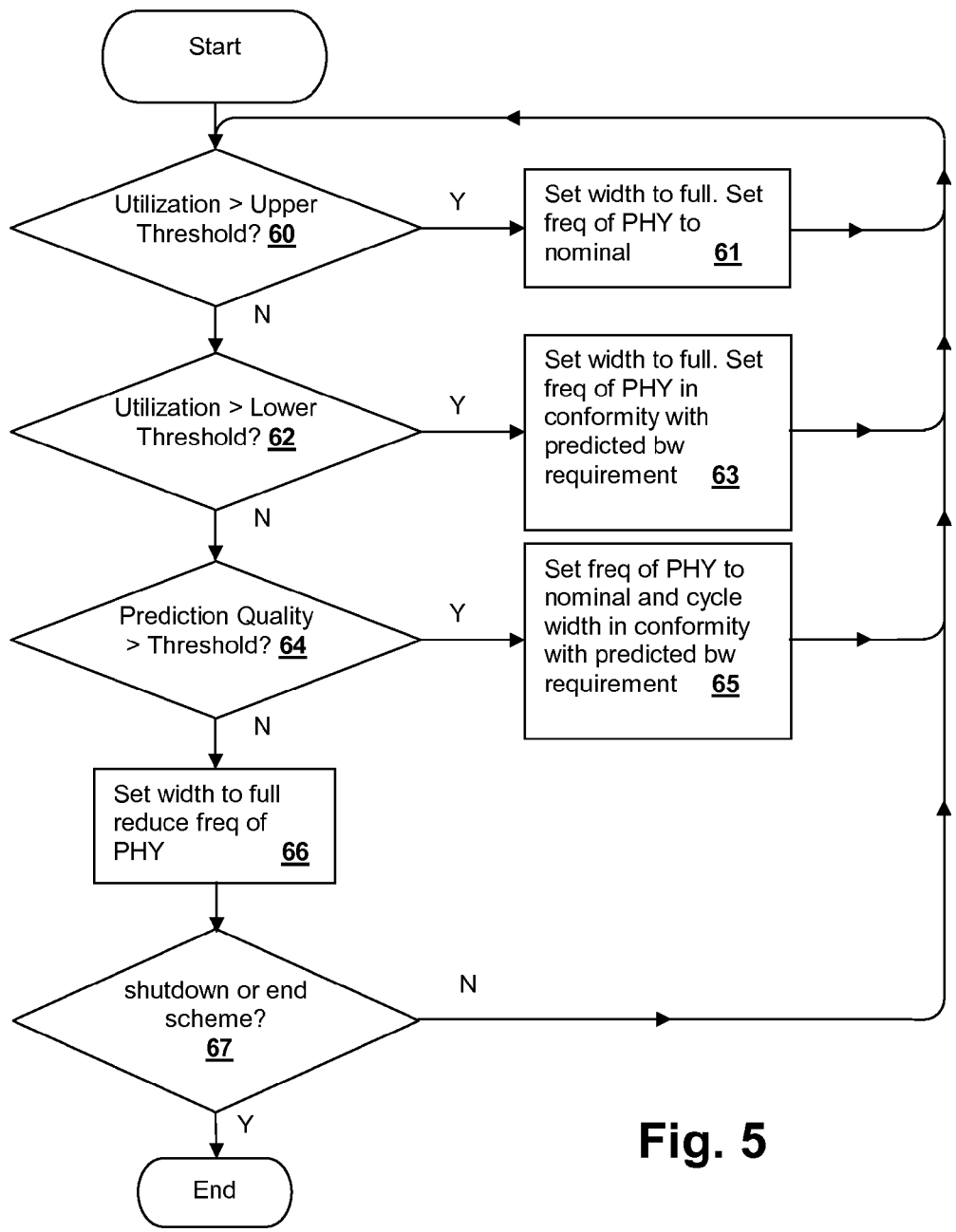
FIG. 5 is a flowchart showing another exemplary method of operating a processing system.

Referring now to FIG. 5, another method of operating an interface physical link layer is illustrated in a flowchart, which may provide a specific implementation for the bandwidth decision-making and adjustment in the method of FIG. 4. If the utilization of the interface is greater than an upper threshold (decision 60), the width of the physical layer (PHY), i.e., the number of active lanes, is set to the full number of available lanes and the operating frequency is set to the nominal (generally the maximum) operating frequency (step 61). If the utilization of the interface is not greater than the upper threshold (decision 60), but is greater than a lower threshold (decision 62), the width of the physical layer is set to the full number of available lanes and the operating frequency is set in conformity with a predicted bandwidth requirement (step 63). If the utilization of the interface is not greater than the lower threshold (decision 62), if the quality of the prediction is greater than a quality threshold value (decision 64), then the frequency of the physical layer is set to the nominal value and the width of the interface is cycled, either periodically or according to a demand threshold, in conformity with the predicted bandwidth requirement (step 65). If the utilization of the interface is not greater than the lower threshold (decision 62) and the quality of the prediction is not greater than the quality threshold value (decision 64), then the width of the physical layer is set to full and the frequency of the interface is reduced (step 66). Until the scheme is ended or the system is shut down (decision 67), steps 61-66 are repeated.

As noted above, portions of the present invention may be embodied in a computer program product, e.g., a program executed processor having program instructions that direct the operations outlined in FIG. 4 and FIG. 5, by controlling the systems depicted in FIG. 2 and FIG. 3. The computer program product may include firmware, an image in system memory or another memory/cache, or stored on a fixed or re-writable media such as an optical disc having computer-readable code stored thereon. Any combination of one or more computer readable medium(s) may store a program in accordance with an embodiment of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of the present application, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A method of managing a physical link layer of an external interface connecting processing units within a computer system, the method comprising:
    receiving an indication of a required bandwidth for operation of the physical link layer;
    from the required bandwidth, determining an active width and operating frequency for the physical link layer that meet the required bandwidth;
    setting a current active width of the physical link layer to the determined active width;
    setting a current operating frequency of the physical link layer to the determined operating frequency;
    operating the physical link layer using the current active width and the current operating frequency;
    predicting a future bandwidth requirement for the physical link layer, and wherein the receiving receives the predicted future bandwidth requirement;
    determining whether or not a current utilization of the external interface is less than a threshold usage;
    evaluating a quality of the predicting;
    comparing the quality of the predicting to a threshold quality; and responsive to determining that the current utilization of the external interface is less than the threshold usage and responsive to the comparing determining that the quality of the predicting is less than the threshold quality, reducing at least one of the current operating frequency or the current active width, wherein the reducing the at least one of the current operating frequency or the current active width comprises reducing the current operating frequency while maintaining the current active width of the physical link layer.

2. The method of claim 1, further comprising determining that the current utilization of the external interface is less than the threshold usage and responsive to the comparing determining that the quality of the predicting is greater than the threshold quality, reducing the current active width while maintaining the current operating frequency of the physical link layer.

3. The method of claim 2, wherein the reducing the current active width is performed periodically by reducing the current active width to zero by powering down the physical link layer of the external interface at periodic intervals and re-powering the physical link layer of the external interface at the end of the periodic intervals.

4. The method of claim 2, further comprising, responsive to determining that the current utilization of the external interface is greater than the threshold usage, setting the current active width to a maximum width and setting the current operating frequency of the physical link layer in conformity with the predicted future bandwidth requirement.

5. The method of claim 4, wherein the predicting predicts a shape of a predicted utilization of the external interface and wherein the setting the current operating frequency controls the current operating frequency in conformity with the shape of the predicted utilization.

6. A method of managing a physical link layer of an external interface connecting processing units within a computer system, the method comprising:
receiving an indication of a required bandwidth for operation of the physical link layer;
from the required bandwidth, determining an active width and operating frequency for the physical link layer that meet the required bandwidth;
setting a current active width of the physical link layer to the determined active width;
setting a current operating frequency of the physical link layer to the determined operating frequency;
operating the physical link layer using the current active width and the current operating frequency;
predicting a future bandwidth requirement for the physical link layer, and wherein the receiving receives the predicted future bandwidth requirement;
determining whether or not a current utilization of the external interface is less than a threshold usage;
evaluating a quality of the predicting;
comparing the quality of the predicting to a threshold quality; and responsive to determining that the current utilization of the external interface is less than the threshold usage and responsive to the comparing determining that the quality of the predicting is less than the threshold quality, reducing at least one of the current operating frequency or the current active width, wherein the reducing the at least one of the current operating frequency or the current active width comprises reducing the current active width while maintaining the current operating frequency of the physical link layer.

* * * * *